United States Patent [19]
Azuma et al.

[11] Patent Number: 5,392,748
[45] Date of Patent: Feb. 28, 1995

[54] IGNITION TIMING CONTROLLING DEVICE FOR AN ENGINE

[75] Inventors: Tadahiro Azuma; Hajime Kako, both of Himeji, Japan

[73] Assignee: Mitsubishi Denki Kabushiki Kaisha, Tokyo, Japan

[21] Appl. No.: 118,245

[22] Filed: Sep. 9, 1993

[30] Foreign Application Priority Data

Sep. 25, 1992 [JP] Japan .................................. 4-256215

[51] Int. Cl.⁶ ............................................. F02P 5/00
[52] U.S. Cl. .................................................. 123/417
[58] Field of Search ................ 123/417, 419, 425, 436, 123/418, 422

[56] References Cited

U.S. PATENT DOCUMENTS

| | | | |
|---|---|---|---|
| 4,823,753 | 4/1989 | Murakami et al. | 123/417 |
| 4,996,958 | 3/1991 | Iwata et al. | 123/417 |
| 5,140,961 | 8/1992 | Sawamoto et al. | 123/417 |

FOREIGN PATENT DOCUMENTS 63-38547  8/1988  Japan ................................. 123/417

*Primary Examiner*—Raymond A. Nelli
*Attorney, Agent, or Firm*—Sughrue, Mion, Zinn, Macpeak & Seas

[57] ABSTRACT

A device for controlling an ignition timing of an engine wherein a basic ignition timing map classified based on a revolution number and an intake quantity of the engine is provided in a main body of a control device and a target ignition timing of the engine is set based on the basic ignition timing map, said main body of a control device comprising: an idling state detecting means for detecting that the engine is in an idling state; and an ignition timing limiting means for comparing a basic ignition timing read from the basic ignition timing map with a predetermined limited ignition timing when the idling state detecting means detects the idling state and selecting the limited ignition timing as the target ignition timing when the basic ignition timing is retarded compared with the limited ignition timing.

1 Claim, 5 Drawing Sheets

5,392,748

IGNITION TIMING CONTROLLING DEVICE FOR AN ENGINE

BACKGROUND OF THE INVENTION

1. Field of the Invention

The present invention relates to an ignition timing controlling device for an engine, which controls an ignition timing of an engine based on a basic ignition timing map.

2. Discussion of Background

Conventionally, an ignition timing controlling device for controlling an ignition timing of an engine, employs a map (a basic ignition timing map) wherein an optimum ignition timing is recorded, in controlling the ignition timing to a target ignition timing.

In this basic ignition timing map, the ignition timing which is optimal to an engine, is classified by a charging efficiency and a revolution number of an engine. Further, the conventional ignition timing controlling device detects the charging efficiency and the revolution number of an engine as running state parameters of an engine. The ignition timing data which correspond to the running state parameters, are read from the basic ignition timing map, based on which the ignition timing is controlled.

The two-dimensional basic ignition timing map which is employed in the conventional ignition timing controlling device, is constructed as shown in FIG. 5. In the basic ignition timing map shown in FIG. 5, values proximate to an optimum ignition timing are set when an engine is in a completely warm-up state, generally, data which are more advanced are set when the revolution number of an engine is high and the charging efficiency is low, and conversely, data which are more retarded are set when the revolution number of an engine is low and the charging efficiency is high. Especially, values which are considerably retarded compared with the optimum ignition timing, are set to prevent knocking, since the knocking is apt to cause in case wherein the revolution number of an engine is low and the charging efficiency is high.

In the above conventional ignition timing controlling device, when the cold-starting is performed in case wherein the atmospheric temperature is extremely low (for instance, −20° C.), the viscosity of an engine oil is extremely large at the extremely low temperature, and therefore, the revolution number of an engine is not elevated at once and is gradually elevated. Further, the charging efficiency is provided with a high value since the intake quantity increases at a low temperature due to the fast idling. Accordingly, ignition data which are comparatively retarded in a region of a low revolution number of an engine and a high charging efficiency, are read, as the ignition timings which are read from the basic ignition timing map. Further, the ignition timing is gradually advanced as shown in a broken-line arrow mark "a" in FIG. 5. In FIG. 5, the broken-line arrow mark "a" designates a locus wherein the charging efficiency $E_c$ and the revolution number $N_e$ (actual revolution number) of an engine change in the extremely low temperature starting, whereas a solid-line arrow mark "b", a locus wherein the charging efficiency $E_c$ and the revolution number $N_e$ (actual revolution number) of an engine change in the ordinary temperature starting.

However, generally, the combustion rate is retarded when the atmospheric temperature is low and the knocking is hard to cause. Therefore, the optimum ignition timing is to be provided with an advanced value compared with that which is set in the basic ignition timing map, and therefore, the ignition timing is considerably retarded compared with the optimum ignition timing in performing the cold-starting at an extremely low atmospheric temperature when the basic ignition timing map is employed.

When the ignition timing is retarded compared with the optimum ignition timing in performing the cold-starting, the elevation rate of the revolution number of an engine is low as shown in a curve A in FIG. 6(b), and the engine is apt to stall. FIGS. 6(a) and 6(b) are graphs showing a state of an engine in starting up the engine. FIG. 6(a) designates a change of the ignition timing in starting up an engine, and FIG. 6(b), a change of the revolution number of an engine in starting up the engine.

SUMMARY OF THE INVENTION

It is an object of the present invention to solve the above disadvantage and to provide an ignition timing controlling device of an engine capable of preventing an engine stall, by swiftly elevating a revolution number of an engine, even when the cold-starting is performed at an extremely low atmospheric temperature.

According to an aspect of the present invention, there is provided a device for controlling an ignition timing of an engine wherein a basic ignition timing map classified based on a revolution number and an intake quantity of the engine is provided in a main body of a control device and a target ignition timing of the engine is set based on the basic ignition timing map, said main body of a control device comprising:

an idling state detecting means for detecting that the engine is in an idling state; and an ignition timing limiting means for comparing a basic ignition timing read from the basic ignition timing map with a predetermined limited ignition timing when the idling state detecting means detects the idling state and selecting the limited ignition timing as the target ignition timing when the basic ignition timing is retarded compared with the limited ignition timing.

When the cold-starting is performed at an extremely low outside temperature, the target ignition timing is limited so that it is not more retarded than the limited ignition timing, in an idling state immediately after the starting.

DETAILED DESCRIPTION OF PREFERRED EMBODIMENTS

EXAMPLE 1

A detailed explanation will be given to an example of the present invention in reference to FIGS. 1 through 4 as follows.

Figure 1:
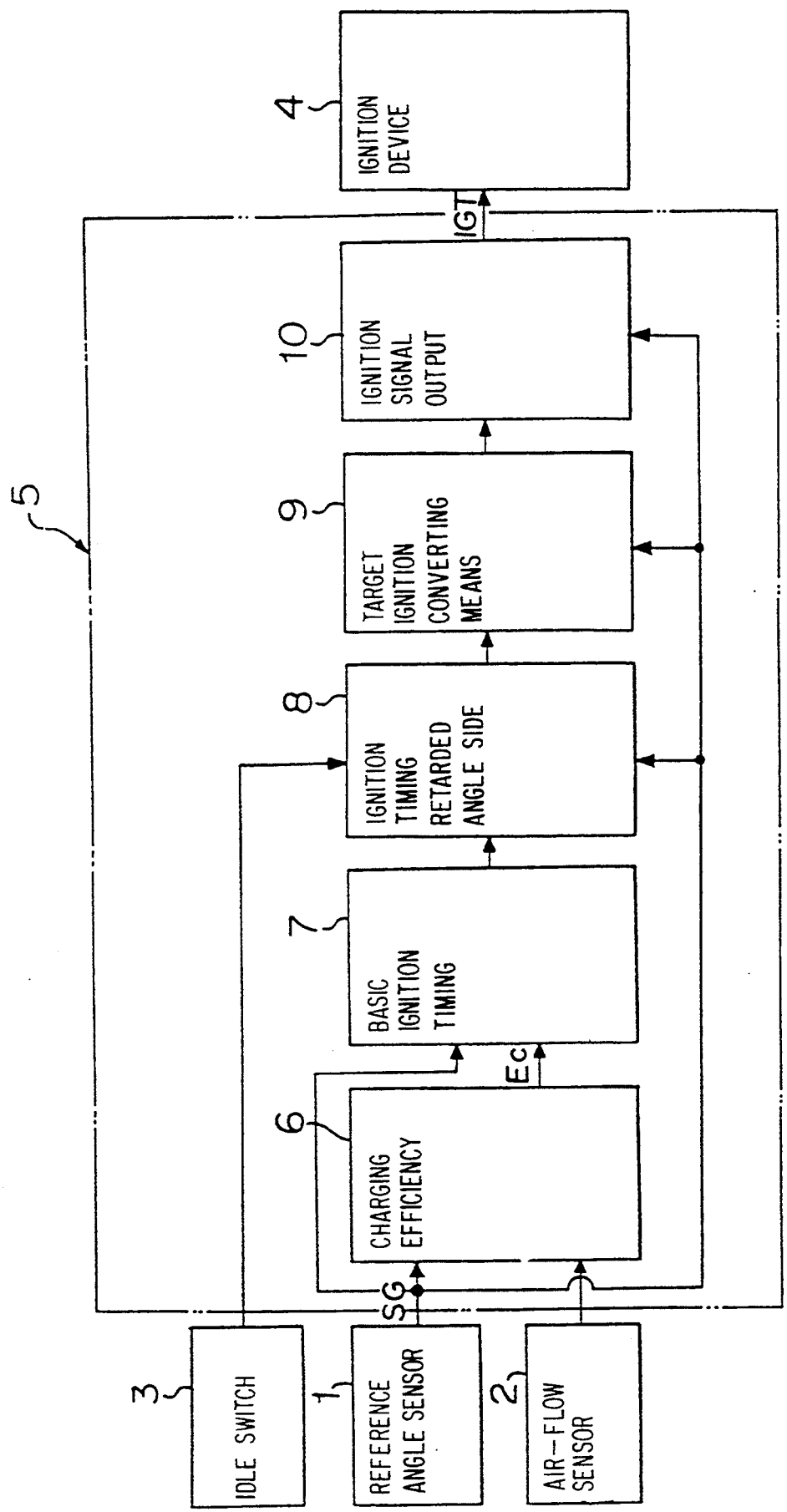
FIG. 1 is a block diagram showing an outline construction of an ignition timing controlling device according to the present invention.
Figure 2:
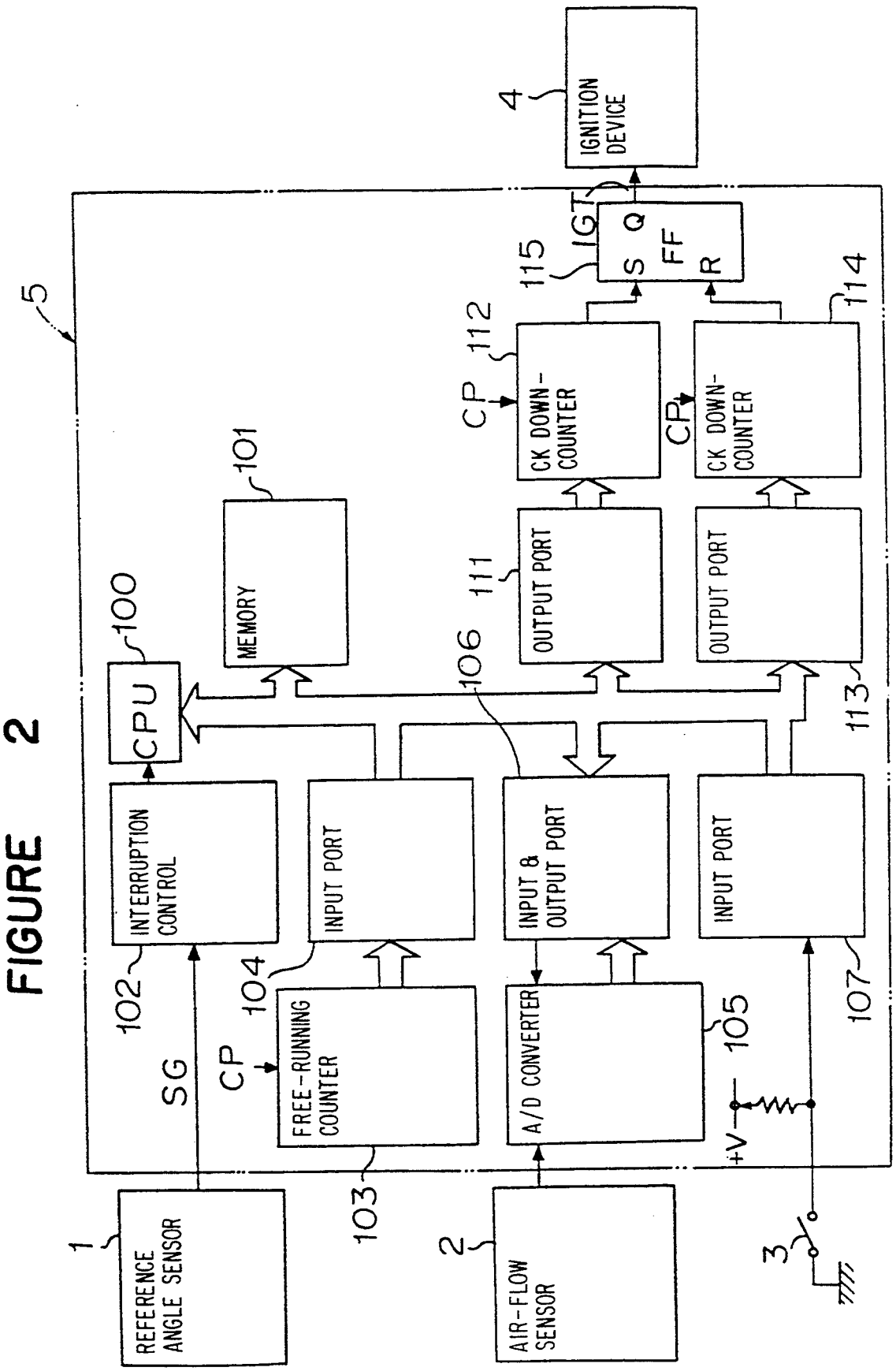
FIG. 2 is a construction diagram showing a specific example of construction of an ignition timing controlling device according to the present invention.
Figure 3:
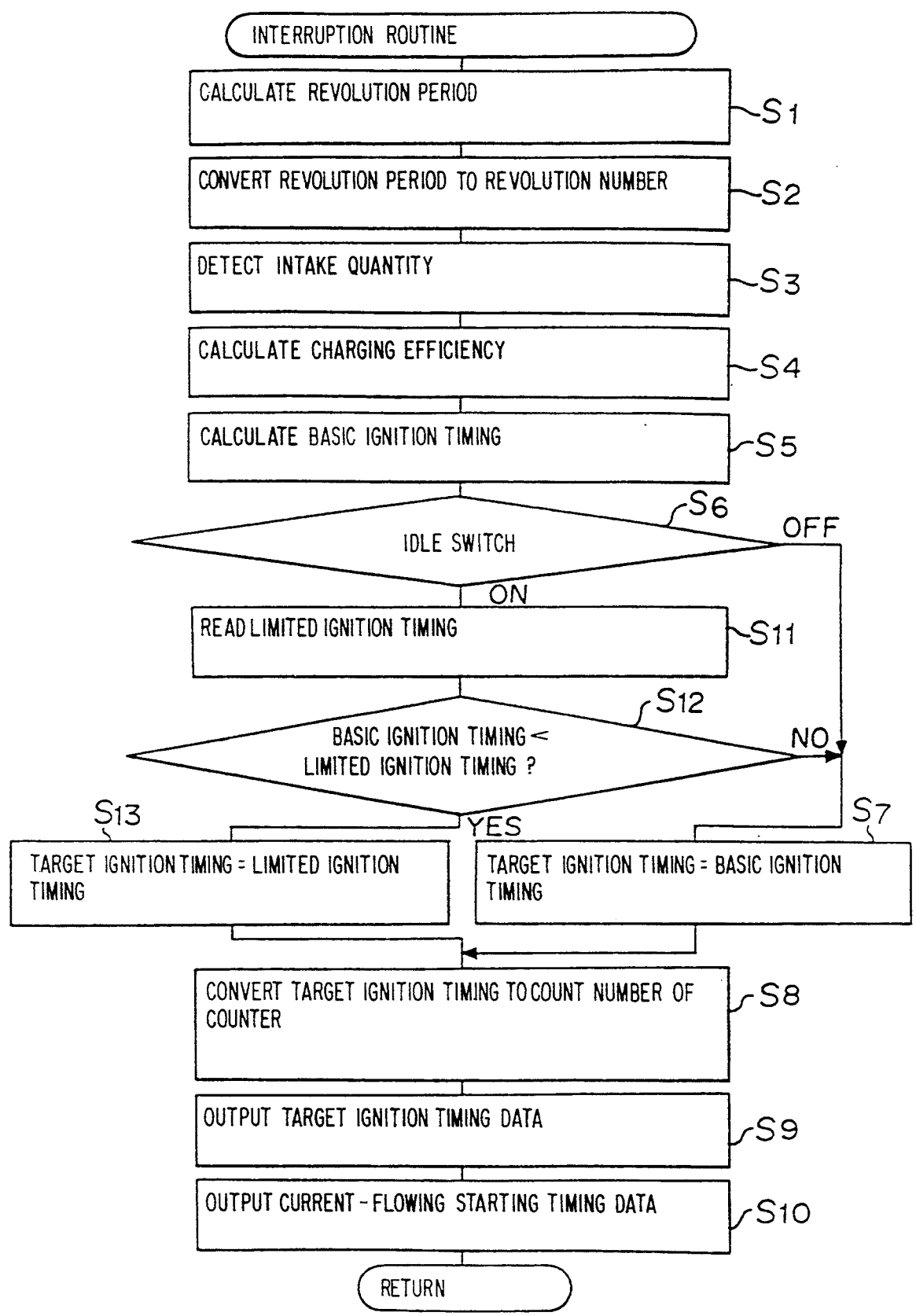
FIG. 3 is a flowchart showing an operation of an ignition timing controlling device according to the present invention.
Figure 4:
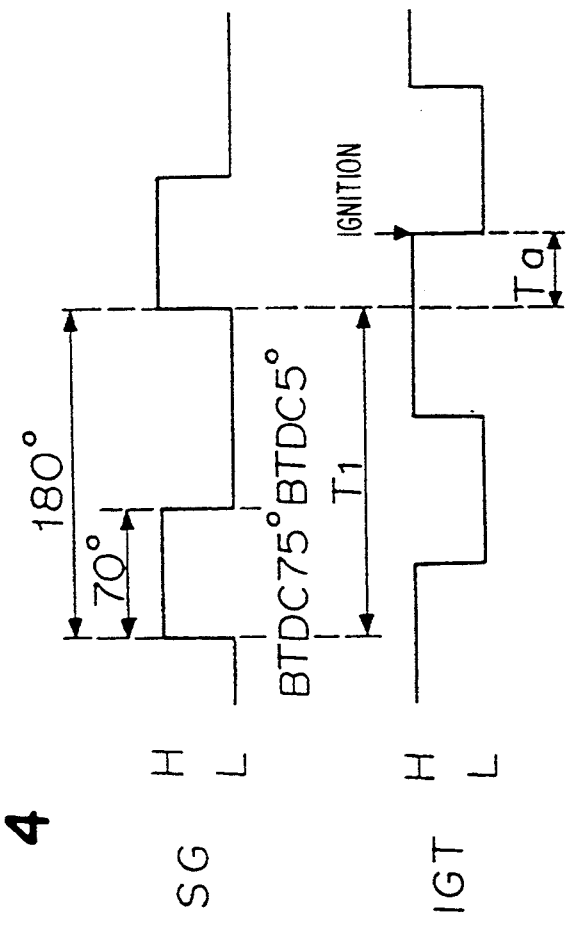
FIG. 4 shows waveform diagrams of signals showing a reference angle signal and timing of an ignition signal.

FIG. 1 shows a block diagram showing an outline construction of an ignition timing controlling device according to the present invention, FIG. 2, shows a construction diagram showing a specific example of construction, FIG. 3, shows a flowchart showing an operation of an ignition timing controlling device according to the present invention, and FIG. 4, shows signal waveform diagrams showing a reference angle signal and timings of an ignition signal.

In these figures, a reference numeral 1 designates a reference angle sensor for detecting a predetermined angle of a crank angle before the top dead center (hereinafter, BTDC), for instance, BTDC 75° of an engine (not shown) and outputting a reference angle signal SG to an electronic control unit, mentioned later. Numeral 2 designates an air-flow sensor for detecting an intake quantity of an engine, and 3, an idle switch which is switched on by detecting an idling position of a throttle valve provided at an intake pipe of an engine.

Numeral 4 designates an ignition device, which is constructed by an igniter which performs an ON/OFF-control of a primary current of an ignition coil in accordance with an ignition signal IGT that is outputted from an electronic control unit, mentioned later, an ignition coil, a distributor, an ignition plug and the like.

Numeral 5 designates an electronic control unit constituting a main body of a control device according to the present invention. This electronic control unit 5 is constructed by a charging efficiency calculating means 6 which calculates a charging efficiency from the revolution number of an engine and the intake quantity, a basic ignition timing calculating means 7 which calculates a basic ignition timing in accordance with the revolution number of an engine and the charging efficiency, an ignition timing on the retarded angle side limiting means 8 which limits the ignition timing such that the ignition timing is not more retarded than a predetermined ignition timing (hereinafter, this ignition timing is designated as a limited ignition timing), when the idle switch 3 is in a switch-on state, a target ignition timing to time converting means 9 which converts the target ignition timing to a time period, an ignition signal outputting means 10 which outputs the ignition signal IGT immediately after the above converted time has elapsed, in reference to the reference angle signal SG, and the like.

The charging efficiency calculating means 6 calculates the charging efficiency $E_c$ based on the reference angle signal SG which is outputted from the reference angle sensor 1 and the intake quantity which is detected by the air-flow sensor 2.

Figure 5:
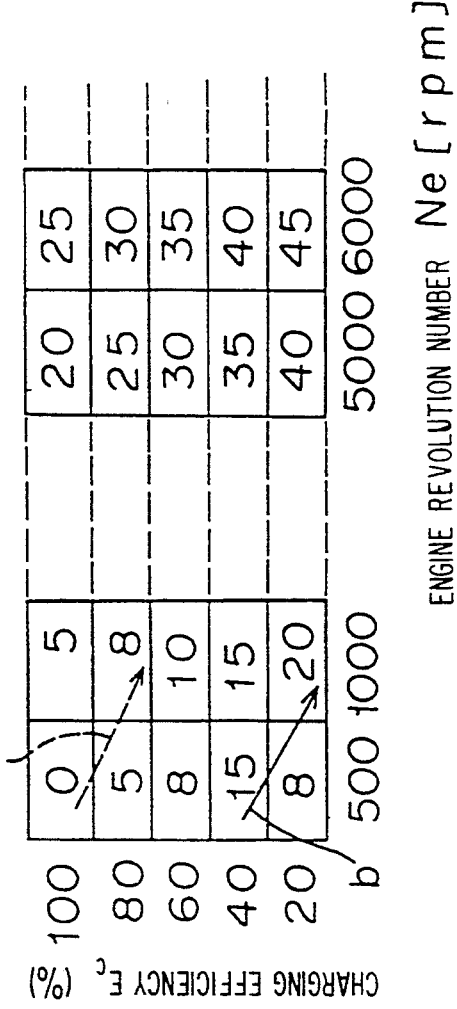
FIG. 5 designates a two-dimensional basic ignition timing map which is employed in a conventional ignition timing controlling device.

The basic ignition timing calculating means 7 reads the basic ignition timing from a two-dimensional basic ignition timing map as shown, for instance, in FIG. 5, based on the charging efficiency $E_c$ which is calculated by the charging efficiency calculating means 6 and an actual revolution number $N_e$ which is provided based on the reference angle signal SG.

The ignition timing on the retarded angle side limiting means 8 determines the basic ignition timing to be the target ignition timing as it is, when the idle switch 3 is switched off, and outputs the target ignition timing to the target ignition timing to time converting means 9. Further, when the idle switch 3 is switched on, the ignition timing on the retarded side limiting means 8 compares the basic ignition timing with the limited ignition timing which corresponds to the actual revolution number $N_e$ which is calculated based on the reference angle signal SG, and outputs a larger value (more advanced value) as the target ignition timing $\theta_{ADV}$ to the target ignition timing to time converting means 9.

The target ignition timing to time converting means 9 provides a time period $T_1$ (shown in FIG. 4) which correspond to 180° of the crank angle of the reference ignition timing signal SG, and converts $\theta_{ADV}$ to a time period of $T_a$ based on the time period $T_1$ and the target ignition timing $\theta_{ADV}$.

The ignition signal outputting means 10 receives the signal of the time period $T_a$, changes the H-level output of the ignition signal IGT to the L-level output when the time period $T_a$ has elapsed from a rise of the reference angle signal SG and outputs the ignition signal IGT to the ignition device 4. Accordingly, the ignition is performed in a combustion changer of an engine by outputting the ignition signal IGT by this ignition signal outputting means 10.

With respect to the timing of the reference angle signal SG and the ignition timing signal IGT, as shown in FIG. 4, when the target ignition timing $\theta_{ADV}$ is designated by an angle of BTDC, $\theta_{ADV}$ can be converted to $T_a$ by a formula of $T_a = (75° - \theta_{ADV})/180° \times T_1$.

A detailed explanation will be given to a specific construction of the electronic control unit 5 in reference to FIG. 2.

In FIG. 2, numeral 100 designates a CPU for performing various calculations and determinations. The CPU is constructed to perform various data processings employing a memory 101 wherein a flowchart, shown in FIG. 3, and mentioned later, is stored in a form of a program.

Numeral 102 designates an interruption control circuit. The reference angle signal SG from the reference angle sensor 1 is inputted to the interruption control circuit 102, which is converted to an interruption order signal in synchronism with the rise (BTDC 75° C.) and is transmitted to the CPU 100. Numeral 103 designates a free running counter which counts a clock pulse CP. When the interruption order signal is generated, a counted value from the free running counter 103 is read by the CPU 100 through an input port 104, by which the revolution period and the actual revolution number $N_e$ of an engine are calculated.

A numeral 105 designates an A/D converter which converts an analog signal of the air-flow sensor 2 to a digital signal. The converted digital signal is inputted to an input and output port 106 from the A/D converter 105.

Further, the idle switch 3 is switched off in a normal running state whereby the H-level is inputted to an input port 107, and switched on in an idling state whereby a ground potential signal is inputted to the input port 107.

The CPU 100 calculates current flowing start timing data of an ignition coil of the ignition device 4 from the ignition timing data by a well-known method, and sets the calculated result to a down counter 112 through an output port 111. The down counter 112 downcounts by the clock pulse CP, and sets an RS flip-flop 115 when the counted value is 0 and has a Q-output terminal output the H-level, thereby flowing current to the ignition coil of the ignition device 4. The time period $T_a$ for forming the ignition signal IGT is set to a downcounter 114 from an output port 113 by the CPU 100 in synchronism with the generation of the interruption order signal. The downcounter 114 resets the RS flip-flop in case wherein the counted value is 0 when the time period $T_a$ has elapsed after the setting. In this way, the output from the Q output terminal of the RS flip-flop 115 changes from the H-level to the L-level and is converted to the ignition signal IGT which breaks the current on the primary side of the ignition coil.

Next, an explanation will be given to the operation of an ignition timing controlling device according to the present invention in reference to a flowchart shown in FIG. 3.

An interruption routine shown in FIG. 3 is performed with the generation of an interruption order signal at a time point (BTDC 75°) of a rise of the reference angle signal SG which is outputted from the reference angle sensor 1.

First, in Step $S_1$, the CPU 100 reads the counted value of the free running counter 103 and calculates the revolution period from a difference between the current counted value and a preceding counted value. Further, in Step $S_2$, the operation converts the revolution period to the actual revolution number $N_e$. In Step $S_3$, the operation reads an intake quantity $Q_a$ which is provided by A/D-converting an output signal of the air-flow sensor 2. Next, in Step $S_4$, the operation calculates the charging efficiency $E_c$ by the actual revolution number $N_e$ and the intake quantity $Q_a$ which have been provided in Steps $S_2$ and $S_3$. In Step $S_5$, the operation provides the basic ignition timing by performing a mapping based on the actual revolution number signal $N_e$ and the charging efficiency $E_c$.

In Step $S_6$, the operation determines whether the idle switch 3 is in a switch-on state or in a switch-off state. When the idle switch 3 is in a switch-off state, the operation proceeds to Step $S_7$ and determines the basic ignition timing as the target ignition timing. When the idle switch 3 is in a switch-on state, the operation proceeds to Step $S_{11}$.

In Step $S_8$, the operation converts the target ignition timing to a counted number of the downcounter 114. This counted number corresponds to the time period $T_a$. In Step $S_9$, the operation sets the counted number corresponding to the time period $T_a$ to the downcounter 114 and proceeds to Step $S_{10}$. In Step $S_{10}$, the operation sets the current-flowing starting timing data to the downcounter 112, and returns to a main routine after the setting.

On the other hand, in Step $S_{11}$, the operation reads the limited ignition timing which corresponds to the actual revolution number $N_e$ from the memory 101. In Step $S_{12}$, the operation compares the read limited ignition timing with the basic ignition timing. When the basic ignition timing is larger (more advanced) than the limited ignition timing, the operation proceeds to Step $S_7$ and carries out the processing which is the same as above. Further, when the limited ignition timing is larger than the basic ignition timing, the operation determines the limited ignition timing as the target ignition timing, in Step $S_{13}$, and proceeds to Step $S_8$. The processing at and after Step $S_8$ is the same as in the above.

Accordingly, in an idling state, the operation compares the basic ignition timing which has been read from the basic ignition timing map with the predetermined limited ignition timing, and determines the target ignition timing to be the limited ignition timing when the basic ignition timing is more retarded than the limited ignition timing. Therefore, in performing the cold-starting when the outside atmospheric temperature is extremely low, the target ignition timing is limited such that it is not more retarded than the limited ignition timing, in an idling state immediately after the starting. That is, when the limited ignition timing is determined to be BTDC 15°, for instance, in the basic ignition timing map of FIG. 5, the actual ignition timing is not more retarded than BTDC 15°, even when the outside atmospheric temperature is extremely low and the charging efficiency is high in an idling time immediately after the starting of an engine.

Figure 6A:
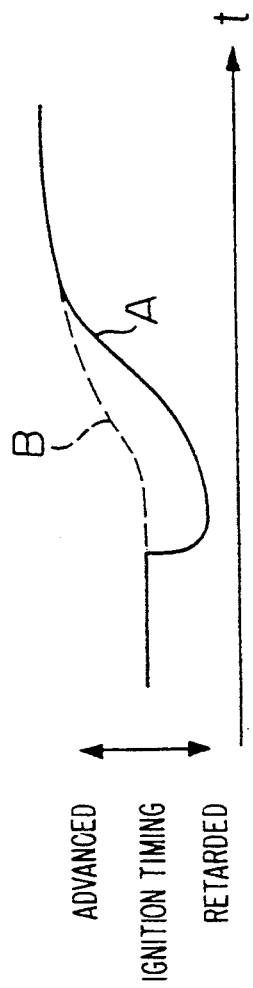
FIGS. 6(a) and 6(b) are graphs showing a state of an engine, wherein FIG. 6(a) designates a change of an ignition timing in starting up an engine, and FIG. 6(b), a change of a revolution number of an engine in starting up the engine.
Figure 6B:
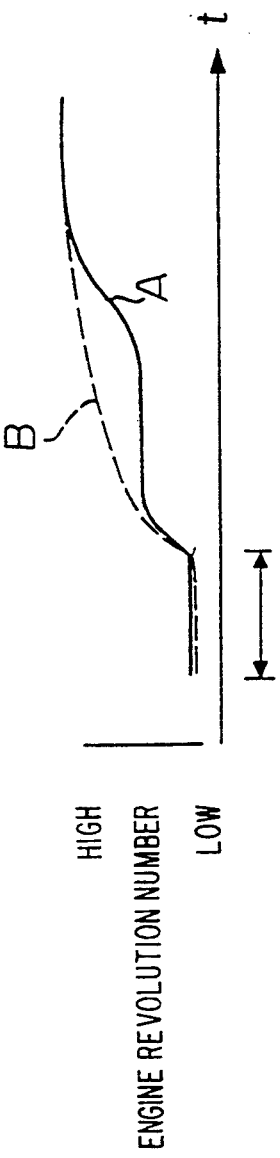

In case wherein the cold-starting is performed by employing the ignition timing controlling device according to the present invention, when the outside atmospheric temperature is extremely low, as shown in curves B in FIGS. 6(a) and 6(b), the elevation rate of the revolution number of an engine is enhanced and the engine is hard to stall.

Further, an example has been shown in this embodiment wherein whether the limiting of the retarded angle side of the ignition timing is to be performed or not, is determined by the state of the idle switch. However, it is possible to perform the determination by detecting an opening degree of the throttle valve. An effect which is the same as in this example can be provided by constructing the device as above.

As stated above, the ignition timing controlling device of an engine according to this invention, is provided with the idling detecting means which detects that the engine is in an idling state, and the ignition timing limiting means which compares the basic ignition timing that has been read from the basic ignition timing map with the predetermined limited ignition timing, in the idling state, and which determines the target ignition timing as the limited ignition timing when the basic ignition timing is more retarded than the limited ignition timing. Accordingly, in case wherein the cold-starting is performed when the outside atmospheric temperature is extremely low, the target ignition timing is limited such that the target ignition timing is not more retarded than the limited ignition timing, in the idling state immediately after the starting. Accordingly, the invention is provided with an effect wherein the revolution number of an engine is rapidly elevated and the engine is hard to stall even when the outside atmospheric temperature is extremely low.

What is claimed is:

1. A control device for controlling an ignition timing of an internal combustion engine wherein:

a basic ignition timing map is generated based upon said engine's revolution number and intake air quantity, to provide a map of selected basic ignition timing values, and a target ignition timing of said engine is determined based upon an idle status of said engine and a preselected one of said basic ignition timing map's basic ignition timing values, said control device comprises:

(a) an idling state detecting means for detecting that said engine is in an idling state;

(b) an ignition timing limiting means for comparing said preselected one of said basic ignition timing value with a predetermined limited ignition timing when said idling state detecting means detects that said engine is in an idling state;
(c) selecting means to set said predetermined limited ignition timing as a new target ignition timing when said basic ignition timing is retarded with respect to said predetermined limited ignition timing and said engine is in said idle state; and,
(d) adjusting means to adjust said ignition timing in accordance with said selecting of said new target ignition timing.

\* \* \* \* \*